UNITED STATES PATENT OFFICE.

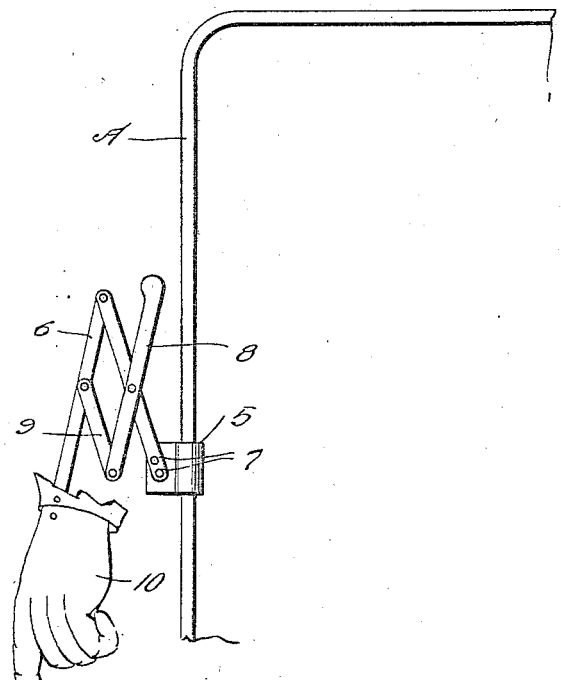
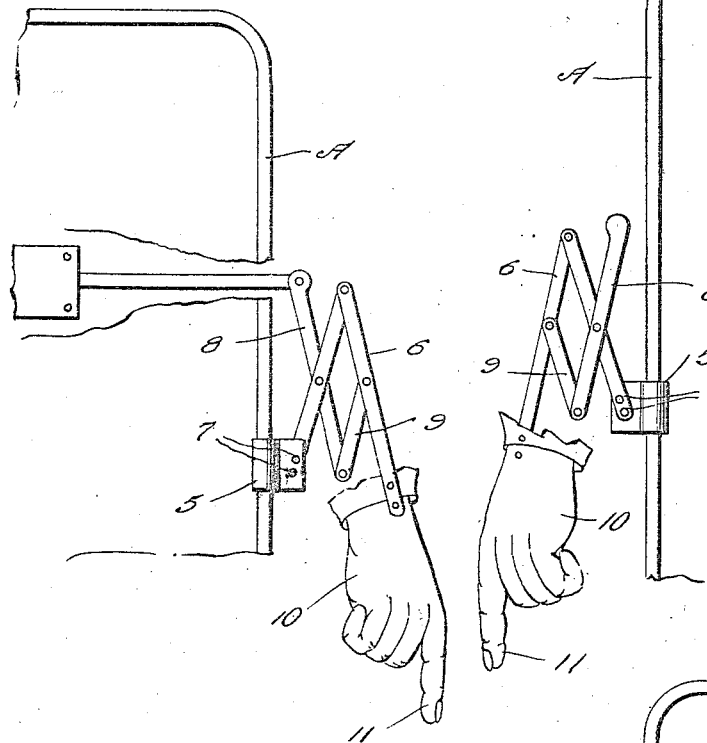
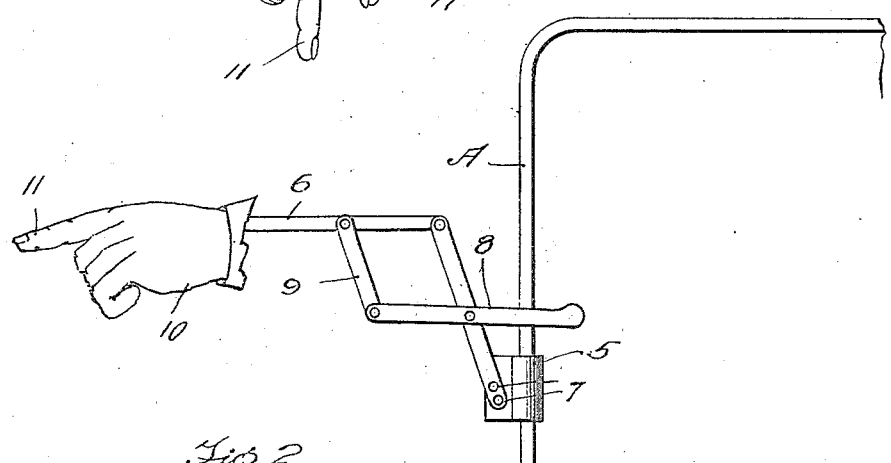

JOHN M. PIPP, OF MUNCIE, INDIANA.

AUTO-SIGNAL.

1,265,814.  Specification of Letters Patent.  Patented May 14, 1918.

Application filed September 8, 1916. Serial No. 119,109.

*To all whom it may concern:*

Be it known that I, JOHN M. PIPP, a citizen of the United States, residing at Muncie, in the county of Delaware and State of Indiana, have invented certain useful Improvements in Auto-Signals, of which the following is a specification, reference being had therein to the accompanying drawing.

The invention relates to a signal, and more particularly to the class of manually operated dash signals for vehicles, automobiles or the like.

The primary object of the invention is the provision of a signal of this character wherein the construction thereof permits the use of the same upon the dash of a vehicle, automobile or the like, and is in convenient reach of the driver or operator thereof so that when the vehicle is taking a curve or turn the signal can be operated to indicate the direction of course of said vehicle, thereby avoiding collisions and accidents.

Another object of the invention is the provision of a signal of this character wherein the construction thereof is novel in form and simulates the hand and the projection thereof of the driver of the vehicle when extended to serve as an indicator to enable pedestrians and traffic to know the course of a particular vehicle when making a turn or taking a curve.

A further object of the invention is the provision of a signal of this character which is extremely simple in construction, readily and easily operated, neat and attractive in appearance, thoroughly reliable and efficient in its purpose and inexpensive in manufacture and installation.

With these and other objects in view, the invention consists in the feature of construction, combination and arrangement of parts, as will be hereinafter fully described, illustrated in the accompanying drawings and pointed out in the claim hereunto appended.

In the accompanying drawing:

Figure 1 is a fragmentary elevation of the dash of a vehicle, showing the signal constructed in accordance with the invention applied, and normally retracted;

Fig. 2 is a similar view showing the signal extended for signaling purposes; and Fig. 3 is a view similar to Fig. 1, looking toward the opposite side of the device.

Similar reference characters indicate corresponding parts throughout the several views in the drawing.

Referring to the drawing in detail, A designates a portion of the dash of a vehicle, automobile or the like, and upon each side thereof is mounted a signal hereinafter fully described.

The signal comprises a base 5, forming a bracket or hanger which is suitably fastened upon the dash in any suitable manner, although the same may be mounted at any other desirable point of the body of the vehicle should the occasion require.

Supported upon the base 5 is a lazytongs 6, one of the pairs of terminal levers of the system thereof being stationarily supported upon rivets 7, carried by the base 5 so that on imparting movement to the lazytongs 6 the same will be extended outwardly in a horizontal plane or retracted for signaling purposes, as will be hereinafter fully described.

The other terminal lever of the pair forms an operating handle 8, which has pivotally connected thereto a link 9, the same being pivoted to the outer terminal lever of the system of levers of the lazytongs 6$^a$ so that on manipulating the handle 8 the said lazytongs will be extended or retracted, as will be apparent.

At the outer end of the said lazytongs is a hand 10, simulating the hand of a person, with one finger 11 in pointing position, which serves the purpose of an indicator.

The signal, when operated will extend the lazytongs 6. This movement will cause the projecting of the hand 10, with the finger 11, outwardly from one side of the body of the vehicle, to simulate the extending of the arm and hand of a person for signaling the direction of course of the vehicle when the same is about to take a turn or make a curve in the direction of travel thereof, and in this manner avoiding a collision and accident.

This signal complies with the traffic regulation to indicate the direction of course of a vehicle to other vehicles following or in advance thereof, the signal being normally retracted, and this is effected by moving the handle 8 in one direction, which latter is in convenient reach of the operator of the vehicle, and said signal can be conveniently extended or retracted with despatch.

From the foregoing it is thought that the construction and manner of use of the invention will be clearly apparent and, therefore, a more extended explanation has been omitted.

Having thus described my invention, I claim:

In a device of the class described in combination with a support, a base plate secured upon such support, a diagonally disposed arm fixed upon said plate, a lever fulcrumed between its ends to said fixed arm between the ends of the latter and having a handle knob formed at its outer end, a lever fulcrumed at its inner end to the outer end of said fixed arm, an indicator hand secured to the outer end of said last named lever, and a link pivotedly connected at one end to the outer end of the first named lever and to said second named lever at its outer end at a point in back of said indicator hand.

In testimony whereof I affix my signature.

JOHN M. PIPP.